(12) United States Patent
Mehra et al.

(10) Patent No.: US 11,727,384 B2
(45) Date of Patent: Aug. 15, 2023

(54) CODE-ENABLED AND PUSH REQUEST PAYMENT TRANSACTION METHODS

(71) Applicant: MASTERCARD INTERNATIONAL INCORPORATED, Purchase, NY (US)

(72) Inventors: Madhur Ratanlal Mehra, Dubai (AE); Sara Absar, Karachi (PK); Shane Lansley Jorge Deniz, Dubai (AE); Ojo K. Oluwasogo, Lagos (NG); Francis Montet, Nairobi (KE); Edwin Kaduki, Nairobi (KE); Ayansola Akanmu, Nairobi (KE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 20 days.

(21) Appl. No.: 16/978,368

(22) PCT Filed: Mar. 8, 2019

(86) PCT No.: PCT/US2019/021265
§ 371 (c)(1),
(2) Date: Sep. 4, 2020

(87) PCT Pub. No.: WO2019/173667
PCT Pub. Date: Dec. 9, 2019

(65) Prior Publication Data
US 2021/0365923 A1 Nov. 25, 2021

(30) Foreign Application Priority Data

Mar. 8, 2018 (PK) ........................... 140/2018
Jan. 7, 2019 (KE) .................. KE/P/2019/3061

(51) Int. Cl.
*G06Q 20/32* (2012.01)
*H04L 67/55* (2022.01)

(52) U.S. Cl.
CPC ....... *G06Q 20/3274* (2013.01); *G06Q 20/326* (2020.05); *G06Q 20/3276* (2013.01); *G06Q 20/3278* (2013.01); *H04L 67/55* (2022.05)

(58) Field of Classification Search
None
See application file for complete search history.

(56) References Cited

U.S. PATENT DOCUMENTS 10,445,629 B2 10/2019 Singh et al.
10,740,735 B2 8/2020 Malhotra et al.
(Continued)

FOREIGN PATENT DOCUMENTS

CN 102184604 A 9/2011
CN 102222294 A 10/2011
(Continued)

OTHER PUBLICATIONS

U.S. Appl. No. 11/328,271, filed May 10, 2022, Malhotra et al.
(Continued)

*Primary Examiner* — Namrata Boveja
*Assistant Examiner* — Amit Patel
(74) *Attorney, Agent, or Firm* — Harness, Dickey & Pierce, P.L.C.

(57) ABSTRACT

A payment transaction method is provided comprising: providing a 2-dimensional coded representation to a payment giver for identifying the payment receiver; providing a code recognition device to recognize the 2-dimensional coded representation as being associated with the payment receiver; commencing a payment transaction from a payment giver to the payment receiver; wherein the 2-dimensional coded representation is provided to the code recognition device using a non-visual interaction channel, and the 2-dimensional coded representation is recognized using non-visual scanning. Alternatively or additionally, a push
(Continued)

request database may be provided which allows a selection to be made between payment using a push request or payment using a 2d coded representation. This selection may be performed by the payment giver, the payment receiver or an arbiter.

8 Claims, 3 Drawing Sheets

(56) References Cited

U.S. PATENT DOCUMENTS

| | | |
|---|---|---|
| 2004/0117250 A1 | 6/2004 | Lubow et al. |
| 2008/0126251 A1 | 5/2008 | Wassingbo |
| 2008/0222048 A1 | 9/2008 | Higgins et al. |
| 2008/0249928 A1 | 10/2008 | Hill et al. |
| 2010/0042538 A1 | 2/2010 | Dheer et al. |
| 2012/0078782 A1 | 3/2012 | Schoenberg et al. |
| 2013/0013499 A1 | 1/2013 | Kalgi |
| 2013/0124412 A1* | 5/2013 | Itwaru ............... G06Q 30/02 705/44 |
| 2013/0166441 A1 | 6/2013 | Kobylkin et al. |
| 2013/0173405 A1 | 7/2013 | Gouessant |
| 2013/0198081 A1 | 8/2013 | Royyuru et al. |
| 2013/0238492 A1 | 9/2013 | Mutha et al. |
| 2014/0006184 A1 | 1/2014 | Godsey |
| 2014/0040051 A1 | 2/2014 | Ovick et al. |
| 2014/0197234 A1 | 7/2014 | Hammad |
| 2014/0372308 A1 | 12/2014 | Sheets |
| 2015/0310421 A1 | 10/2015 | Xie et al. |
| 2016/0247141 A1 | 8/2016 | Graylin et al. |
| 2017/0046671 A1* | 2/2017 | Shauh ............... G06Q 20/3276 |
| 2017/0262819 A1 | 9/2017 | Malhotra et al. |
| 2017/0262832 A1 | 9/2017 | Deshpande et al. |
| 2021/0056535 A1* | 2/2021 | Xu ................. G06K 7/1417 |

FOREIGN PATENT DOCUMENTS

| | | |
|---|---|---|
| CN | 103778531 A | 5/2014 |
| CN | 104303197 A | 1/2015 |
| EP | 1528518 A1 | 5/2005 |
| WO | WO2016/018255 | 2/2016 |

OTHER PUBLICATIONS

"MasterCard Money Send"; https://developer.mastercard.com/portal/display/api/MoneySend; accessed Feb. 25, 2016; 6 pgs.

* cited by examiner

CODE-ENABLED AND PUSH REQUEST PAYMENT TRANSACTION METHODS

CROSS-REFERENCE TO RELATED APPLICATIONS

This application is a U.S. national stage filing under 35 U.S.C. § 371 of International Application No. PCT/US2019/021265, filed Mar. 8, 2019, which claims the benefit of and priority to Pakistan Patent Application No. 140/2018, filed Mar. 8, 2018, and Kenyan Patent Application No. KE/P/2019/3061, filed Jan. 7, 2019. The entire disclosure of each of the above applications is incorporated herein by reference.

FIELD

The present disclosure generally relates to payment transaction methods between a payment giver and a payment receiver. It also relates to the use of visually-readable 2-dimensional coded representations and code recognition devices configured and arranged to recognize such codes.

BACKGROUND

Quick Response (QR) codes were invented more than 25 years ago to assist in tracking car parts in Japan. Since then, they have been used to provide a way to visually convey information to consumers that cannot be easily remembered—for example, many advertisers include a QR code which, when scanned by a consumer's smartphone camera, conveys a URL to a website with more information on the product.

Very recently, some use has been made of the QR code to automate payment transactions. The current trend of consumer's carrying a smart device, comprising an image capture device, such as an optical camera, and image processing software, is being utilized to scan a QR code displayed or reflected on another device, sticker, decal etc. The QR code is primarily used to visually convey merchant details and relevant account details.

Although the capabilities of smart devices continue to improve with each generation, the use of QR codes requires some skill from the user, and problems are frequently reported with blurred images, incomplete or cropped images, incorrect distances and/or camera zoom, and problems due to being too close or too far away. The display of the QR code itself is frequently too small, too large, a border that is too small or with too little contrast. Recognition failure if either the displayed QR code or the smart device is moving is also common. In some cases, synchronization can be a problem if the QR code is only displayed at a certain moment, for a short period of time, or it is displayed on a digital screen that turns off to save power.

Current efforts to improve the use of visually-readable 2-dimensional coded representations (2D codes) have focused on improving the smart device cameras to improve the quality of the images taken, reducing the reliance on the user's timing and skills. In addition, many different types of 2D codes have been introduced, making it more difficult to have an up-to-date device capable of recognizing them. The use of colors and logo's in the codes are also expected to increase.

For payment transactions in particular, users (both consumers and merchants) are demanding that the interaction become more user friendly and less sensitive to user errors.

It is an object of the invention to provide an improved code-enabled payment transaction method.

GENERAL STATEMENTS

According to a first aspect of the present disclosure, there is provided a payment transaction method comprising: generating a visually-readable 2-dimensional coded representation of data, the data comprising a payment receiver identification; providing the 2-dimensional coded representation to a payment giver for identifying the payment receiver; providing a code recognition device comprising a first processor, the first processor being programmed to recognize the 2-dimensional coded representation as being associated with the payment receiver; commencing by the code recognition device a payment transaction from a payment giver to the payment receiver; wherein the 2-dimensional coded representation is provided to the code recognition device using a non-visual interaction channel, and the 2-dimensional coded representation is recognized using non-visual scanning.

The invention is based on the insight that, although 2D codes can provide a convenient and quick way to convey complex information, user-friendliness is severely limited by the requirement that the 2D codes should be visually scanned. A smart device with an optical camera is always required, and the 2D code should always be displayed somewhere close by.

For backwards compatibility and maximum interoperability, the 2D code should be retained—however, if the payment giver may receive the code by a non-visual interaction channel and recognize the 2D code using non-visual scanning, speed and reliability of interaction will be increased. In addition, the 2D codes may be provided when the payment receiver and payment giver are remote from each other—in other words, no longer in visual range.

According to a second aspect of the current disclosure, method further comprises: providing a POI (Point of Interaction) terminal comprising a second processor, the second processor being programmed to provide the 2-dimensional coded representation to the payment giver if the payment giver is proximate the POI terminal.

Although not essential to the invention, it may be advantageous during off-line shopping for the payment receiver to use a POI terminal to provide the 2D code when the payment giver is close by. However, compared to current usage, this embodiment allows the payment transaction to commence at any technically-feasible distance, even when not in visual range.

According to a third aspect of the current disclosure, the payment receiver and payment giver may be a merchant, a person, peer or a consumer, and any combinations of these.

The method may be advantageous for traditional purchases between a merchant and consumer who are in close proximity. However, being able to perform payment transactions remotely is particularly advantageous for P2P (person-to-person or peer-to-peer) payments, such as those used on on-line auction sites, or any kind of e-commerce.

According to a fourth aspect of the current disclosure, the code recognition device may be comprised in an integrated circuit, a bio-sensor, a medical implant, a contacted card, a contactless card, a portable electronic device, a SIM module, a mobile communications device, a mobile computer, a remote server, or any combination thereof.

By eliminating the need for an image capture device to assist in visually-reading the 2D code, it becomes possible to use the advantages of code-enabled payment transactions with a wider range of devices. For example, those devices where being in visual range is impractical, such as a medical implant, or those too small or too cheap to include an optical camera, such as contactless card.

According to a fifth aspect of the current disclosure, the first processor is further programmed to delay commencing the payment transaction until the payment giver provides an interaction.

Current uses of 2D codes require the user to verify that the payment transaction should commence. This is often required because the user typically needs to check that the image capture and code recognition have been performed correctly, because of the many problems which may occur in practice due to the need for visual recognition of the 2D codes. Although not essential for the invention, this option may still be advantageous to allow the user to indicate that they approve the payment transaction which is about to commence. However, with this embodiment, the user does not need to check the quality and accuracy of the image capture and recognition—the user is able to concentrate on the other data items provided in the 2D code, such as the payment amount or whether the payment transaction is to be repeated periodically. Additionally, the processor may be further programmed to explicitly prompt the payment giver to provide the interaction.

According to a sixth aspect of the current disclosure, the code recognition device may further comprise a display; and the first processor may be further programmed to depict the 2-dimensional coded representation on the display.

Although not essential for the invention, this option may be advantageous as it confirms the 2D code that has been provided for the payment transaction, so that the payment giver may verify that the visual parts of the 2D code are as expected. For example, if a logo or readable text is provided with the 2D code, the merchant may be wholly or partially identified.

According to a seventh aspect of the current disclosure, the data further comprises a static type identification; the first processor is further programmed to recognize the 2-dimensional coded representation as being the static type; and the code recognition device is further configured and arranged to commence a plurality of payment transactions to the payment receiver if the static type is recognized.

Although many payment transactions are performed using dynamic 2D codes, which are valid for a single payment transaction, this embodiment may be advantageous where static 2D codes are provided allowing payment transactions to be repeated more than once, or even periodically.

According to an eighth aspect of the current disclosure, a code recognition device is provided for use by a payment giver to commence a code-enabled payment transaction as detailed above. The code recognition device is configured and arranged: to receive a visually-readable 2-dimensional coded representation of data, the data comprising a payment receiver identification; the code recognition device comprising: a first processor programmed to recognize the 2-dimensional coded representation as being associated with the payment receiver; the code recognition device being further configured and arranged: to commence a payment transaction from the payment giver to the payment receiver; wherein the 2-dimensional coded representation is received using a non-visual interaction channel, and the 2-dimensional coded representation is recognized using non-visual scanning.

According to a further aspect of this disclosure, a computer-implemented payment transaction method is provided comprising: establishing a push request database, the database being associated with a plurality of payment givers and comprising payment giver identification data; initiating a payment transaction between a payment giver and a payment receiver; requesting authorization of the payment giver to use a push request; providing authorization if identification data of the payment giver is comprised in the push request database; in case of authorization: providing a payment push request to the payment giver comprising a payment receiver identification; and commencing the payment transaction from the payment giver to the payment receiver by accepting the push request; or in case of no authorization: performing the methods according to any of the other embodiments in this disclosure that make use of a 2d coded representation.

By providing a push request database, the use of 2d coded representations may be avoided under certain circumstances—this provides an alternative solution to the problems of recognizing 2d coded representations.

Authorization of the payment giver to use a push request may be requested by the payment giver, the payment receiver, a third-party or any combination thereof.

This provides for a high degree of flexibility. More than one push request database may also be provided.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION

Figure 1B:
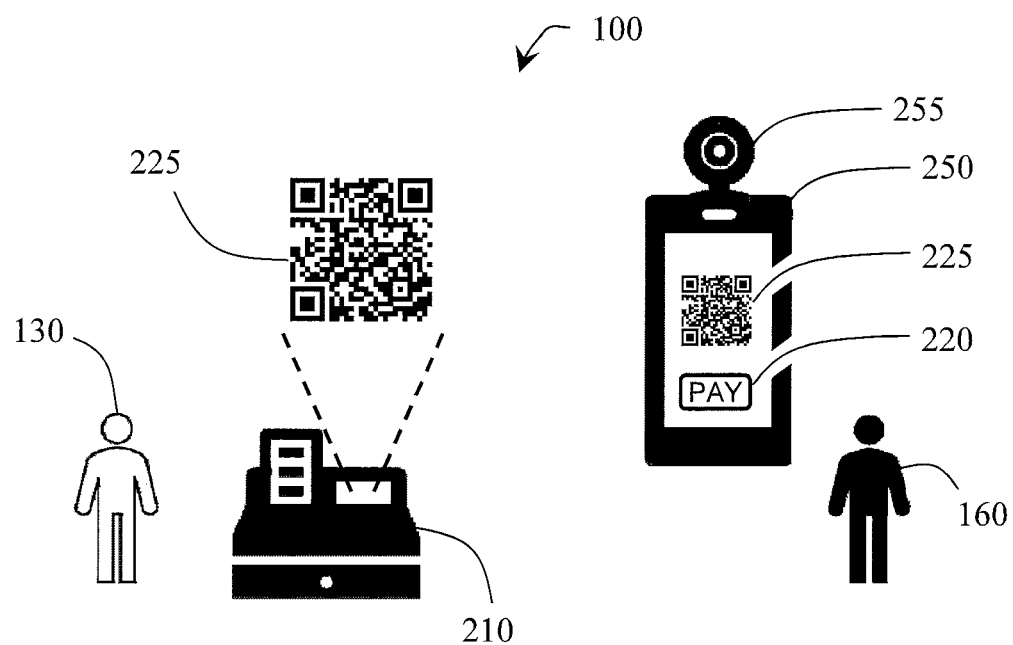
FIGS. 1a and 1b depict a typical code-enabled payment transaction.
Figure 1A:
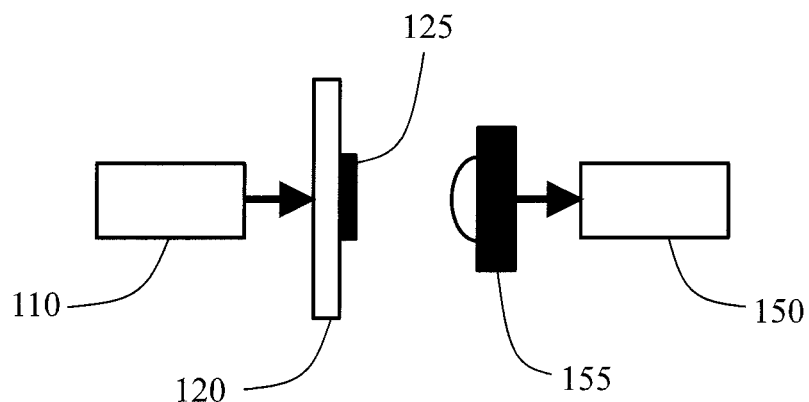

A typical code-enabled payment transaction 100 is shown in FIG. 1a and FIG. 1b—a payment receiver 130, such as a merchant, wishing to receive a payment from a payment giver 160, such as a consumer, may provide a visually-readable representation of a 2D code 125, such as a QR code 225. As the representation 125 should be visually-readable, it is usually provided by a POI terminal 110 on a display 120. A POI terminal 110 may be implemented in any convenient combination of hardware and software to provide interoperability with code recognition device 110—for example, it is frequently comprised in a POS 210 or ATM and includes a processor which has been programmed to provide the 2D code. The display 120 may, for example, be an electronic display, such as found on a Point-Of-Sale System (POS) 210, or printed, such as stickers or decals. The 2D code 125 may also be a sticker attached to an outer surface of the POS system 210. The 2D code 125, and in particular the QR Code 225, encodes data such as the merchant details.

To commence the payment transaction 100, the consumer 160 requires a code recognition device 150 comprising a suitable image capture device 155, such as a mobile device 250 with an optical camera 255. The code recognition device 150 also requires software, such as an app, which programs the device processor to be able to recognize the code 125, 225.

The consumer 160 starts the appropriate scanning software on the device 150, 250 and moves within visual range of the 2D code 125. The consumer 160 then direct the image capture device 155 towards the 2D code 125. The software application typically depicts the real-time image being captured 155, allowing the user to find the optimum image conditions to start the capture. After capture of the image 155, the image is visually-scanned, recognized and decoded by the code recognition device 150. If image capture or recognition is not successful, the user will be usually instructed to repeat the capture and recognition.

Usually, a successful capture and recognition is depicted on the screen using a representation of the 2D code—for example, the mobile device 250 may depict the QR code 225 captured and recognized. This signals to the consumer 160 that none of the problems mentioned above have occurred, or any problems have been overcome.

Note that the consumer 160 cannot visually-read the QR code 225 itself, although some of the decoded details, such as the merchant name or merchant category code may be displayed.

As the capture and recognition are frequently subject to user errors, and may need to be repeated several times, confirmation is usually required from the consumer that the payment transaction may commence. This may be a part of much broader authorization requirements. On a mobile device 250, a button 220 is usually provided indicating that it should be touched for payment to commence—for example, by using the word "PAY with QR". Conventionally, further interactions may also be required to authenticate or verify the identity of the consumer 160 using, for example a PIN code and/or biometric data 2D codes 125, and in particular QR codes 225, are designed to be displayed and visually scanned by separate devices. Being a recent technology and the availability of smart devices 250 with optical cameras 255, has resulted in the use of visual-scanning becoming the standard way of working, and improvements in the user friendliness have tended to focus on improving the image capture.

Figure 2B:
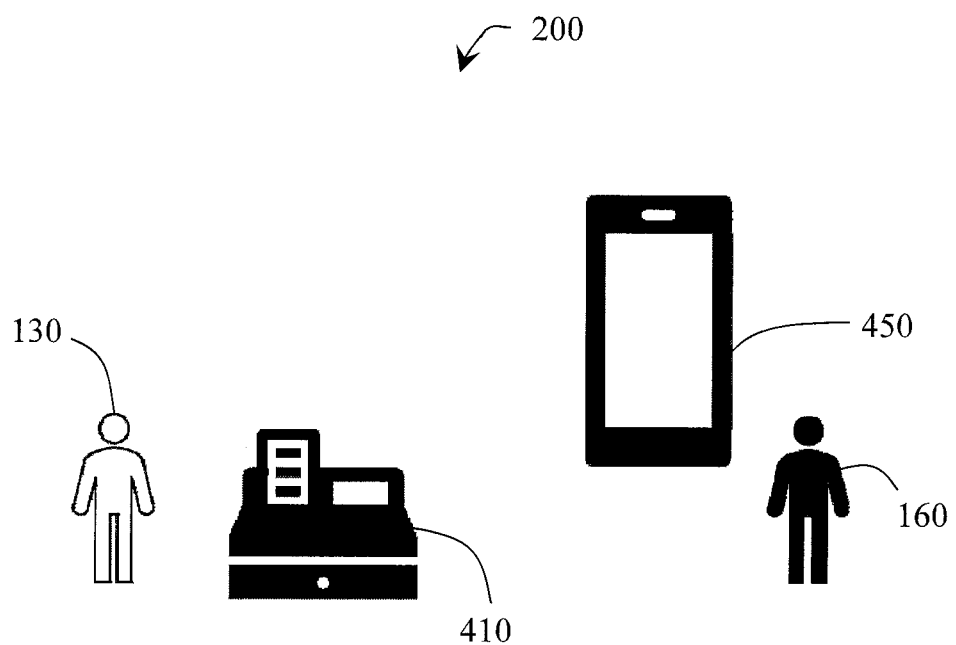
FIGS. 2a and 2b depict an improved code-enabled payment transaction.
Figure 2A:
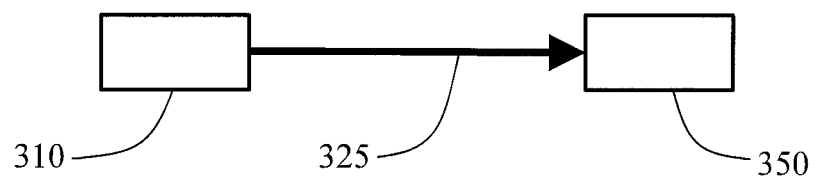

An improved code-enabled payment transaction 200 is shown in FIG. 2a and FIG. 2b—a payment receiver 130, such as a merchant, wishing to receive a payment from a payment giver 160, such as a consumer, may provide a visually-readable representation of a 2D code 125, such as a QR code 225. However, the improved POI terminal 310 does not need to provide it a visual-readable form—it may be provided to the improved code recognition device 350 using a non-visual interaction channel 325.

For example, the non-visual interaction channel 325 may be configured and arranged to use electrical contact, close coupling, electromagnetic radiation, NFC, RF, Bluetooth, WiFi, mobile data, LAN, USB, HTTP, HTTPS, FTP, or any combination thereof. A preferred channel 325 is likely to be one that supports email traffic. A number of these examples of non-visual interaction channels 325 are supported by mobile devices. By appropriate modifications to the hardware and/or software using conventional techniques known to the skilled person, an improved mobile device 450 may be provided to perform the improved code recognition 350.

The 2D code 125 is provided to the improved code recognition device 350, which recognizes the code using non-visual scanning. In other words, the data comprised in the 2D code is decoded using a software scan of the data records, and not by visually-scanning the captured image.

Therefore, when using an improved mobile device 450, comprising the appropriate software, or apps, to receive the data records of the 2D code 125 instead of the image representation.

It also comprises the appropriate software to recognize the code using non-visual scanning. This software may be provided by the merchant in their own apps, or they may be part of the app for a social platform that allows payment transactions to be commenced, such as Facebook and WhatsApp.

The 2D code 125 may also be provided, either visibly or invisibly on a merchant website—when browsing the website with an improved mobile device 450, for example, the 2D code will be provided using an appropriate plug-in for the browser. Note that the transfer of the data from the 2D code occurs directly—any representation on a website is not captured as an image. Similarly, it may be provided as visibly or invisibly, for example, on the merchant profile page of a social media platform, or in a post, or in an advertisement. Similarly, in-game payment transactions may also be commenced.

By implementing a non-visual data handling for a visually-readable 2D code, the improved payment transaction method 200 considerably reduces, and in some cases eliminates, user errors and delays due to user interaction. It is no longer required for the improved POI terminal 310 and improved code recognition device 350 to be within visual range of each other, allowing payment transactions to be commenced however close or remote the payment receiver 130 and payment giver 160 are physically located. The improved POI terminal 310 and improved POS system 410 no longer require conventional displays. The skills of the users no longer affect the commencement of the payment transaction.

In addition, as the payment transaction may be automated to a high degree, some businesses who require user and merchant interaction to be as low-level as possible, for example Uber or Careem, may find the improved payment transaction advantageous.

As the payment giver 160 no longer needs to check image capture and recognition accuracy, it is no longer necessary to depict the 2D code 125 on the display of the improved mobile device 450. It is also no longer necessary to require interaction from the user to commence the payment transaction—in other words, a "PAY with QR" button is no longer required. Note that it may be advantageous to depict these optionally—see below.

It is preferred to use visually-readable 2D codes to ensure the highest degree of backwards compatibility and interoperability. Any type of 2D matrix code, 2D dot code or 2D barcode may be used: for example an Anato dot pattern, an Aztec code, a CrontoSign, a ColorCode, a Color Construct Code, a CyberCode, a d-touch, a DataGlyph, a Data Matrix, a Datastrip code, a Digimarc Barcode, a DotCode, a Dot Code, a DWCode, an EZcode, a High Capacity Color Barcode, a Han Xin Barcode, a HueCode, an InterCode, a MaxiCode, an MMCC, an MPQR code, a NexCode, a PDF417, a Qode, an AR Code, a ShotCode, a Snapcode, a SPARQCode, a VOICEYE, or any combination thereof.

Most preferred is any suitable form of QR code, such as a Micro QR code, an IQR code, a HCC2D code, an SQRC code, a FrameQR code, or any combination thereof because these are already in use for payment transactions. The data may be simply encoded and unencrypted. It may also be encrypted—this may be particularly advantageous for payment transactions.

To commence the improved payment transaction 200, the consumer 160 may configure the improved code recognition device 350, such as improved mobile device 450, to automatically commence a payment transaction after receiving an appropriate 2D code and when certain conditions are met. These may be pre-determined, or set by the consumer 160 shortly before the transaction is commenced. For example, a rule may be set that food transactions below 20 EUR are paid when a 2D code is received from a certain fast food chain.

Although close proximity is no longer required between the improved POI terminal 310 and the improved code recognition device 350, it may be advantageous to configure the improved code recognition device 350 to take this into account. For example, a rule may be set that food transactions of any amount are paid when the consumer 160 is located inside one of the fast food chain restaurants. Alternatively and/or additionally, the POI terminal 310 may comprise a processor, programmed to provide the 2D code 125, 225 to the payment giver 160 if the payment giver 160 is proximate the POI terminal 310.

In many cases, the payment giver is a consumer 160 and the payment receiver 130 is a merchant. However, the method may also be operated in reverse to perform a refund payment transaction—the improved code recognition device 350 may then be further programed to operate as a POI terminal, providing a 2D code associated with the consumer 160, and the improved POI terminal 310 being further programmed to act as a code recognition device. Similarly, the improved method may be advantageous for commencing peer-to-peer and person-to-person payment transactions.

The improved code recognition device 350 may be comprised in an integrated circuit, a bio-sensor, a medical implant, a contacted card, a contactless card, a portable electronic device, a SIM module, a mobile communications device, a mobile computer, a remote server, or any combination thereof. This is not possible with conventional systems and methods 100 due to the requirement to stay within visual range, and for the code recognition devices 150 to include an image capture device 155.

Recognition of the code may be performed using a dedicated software application, or using a similar facility in an existing payment application such as Apple Pay, Android Pay, X Pay and Samsung Pay. A combination is also possible, where a plug-in module is provided for another application, such as a browser.

Optionally, a successful capture and recognition may be depicted on the screen using a representation of the 2D code—for example, the mobile device 250 may depict the QR code 225 provided to it as non-visual data.

The skilled person will also realize that any symbol, button or icon may be used for this depiction, not just one based upon the actual data received. It may even be a fixed, or "dummy" QR code 225 as consumers 160 cannot interpret the QR code 225 manually. For most uses, it is not required that the data used to create the QR code 225 being recognized is used fully or partially to generate the depiction on the screen. Additionally and/or alternatively, some of the decoded details, such as the merchant name or merchant category code may be displayed.

As the capture and recognition in the improved payment transaction method 200 are much less sensitive to user errors, payment transactions may commence without the consumer approving the transaction. However, it may be advantageous to provide some means of interaction and/or approval or authorization as an option—for example, a button 220 marked with "PAY with QR". Alternatively, the button may depict a QR code generated using the data received, or a standard QR code icon. Further interactions may also be required to authenticate or verify the identity of the consumer 160 using for example, a PIN-code and/or biometric data.

Optionally, it may be advantageous for improved code recognition device 350 to be further programmed to provide the payment receiver 130 and/or the payment giver 160 with an indication that the payment transaction has been completed.

In combination with suitable interaction technology such as NFC or Bluetooth, the improved mobile device 450 may be used as an improved code recognition device 350 to commence payment transactions using suitable applications. Such applications include Apple Pay, Android Pay, X Pay and Samsung Pay.

In some cases, the improved mobile device 450 may comprise more than one payment applications suitable for use. The payment giver 160 may then be prompted to select the payment application to be used for the transaction.

Most preferably, an EMV-compliant QR code or an EMV QRCPS-compliant QR code is used for the code-enabled payment transaction. Electronic authorization systems for payment transactions use identification protocols, such as those developed by EMVCo LLC which are publicly available at https://www.emvco.com/document-search. They ensure the highest degree of worldwide interoperability between POI terminals and payment applications and devices.

Recently, EMVCo has standardized the use of QR codes for payments systems—A QR Code Specification for Payment Systems (EMV QRCPS) v.1.0 July 2017 describing both a Merchant-Presented Specification and a Consumer-Presented Specification. As indicated above, this invention may be operated in both Consumer-Presented and Merchant-Presented modes.

Two main types of QR code 225 are recognized
- dynamic, where a new QR code is provided for each payment transaction
- static, where the same QR code may be used for more than one payment transaction.

The data encoded in the QR code will indicate the type—in most cases, it will be the dynamic type. For the other cases, the processor of the improved code recognition device 350 may be further programmed to recognize the 2D code as being the static type.

The improved code recognition device 350 may then be further configured and arranged to commence a plurality of payment transactions to the payment receiver 130 if the static type is recognized.

In the case of the static type, the QR code may be provided by the payment receiver 130 before each payment transaction is due, for example by e-mail. Alternatively and/or additionally, the improved code recognition device 350 may be provided with electronic storage to store the static 2D codes.

As used herein and in the appended claims, the term "processor" should be understood to encompass a single processor or two or more processors in communication with each other.

The term "visually-readable" is not limited to the capabilities of human sight, but should be understood to include any suitable electromagnetic light wavelengths, including infra-red and ultraviolet. The term "non-visual scanning" should be interpreted as not using optical or electromagnetic light wavelengths to recognize the representation, but limited to data analysis only. The term "non-visual interaction channel" should be interpreted as including any form of electromagnetic radiation, including infra-red, visible light, and ultra-violet—the representation is provided as a data stream via this channel. For example, an infra-red data communication channel may be used to provide the representation data similar to the way a remote-control provides signals to a television.

Alternatively or additionally, a push request database 600 may be provided which allows a selection to be made between payment using a push request or payment using a 2d coded representation 125, 225. This selection may be performed by the payment giver 160, the payment receiver 130 or an arbiter. In other words, the problem of having to recognize a 2d coded representation 225 may be also be solved by not providing the 2d coded representation under certain circumstances.

Figure 3:
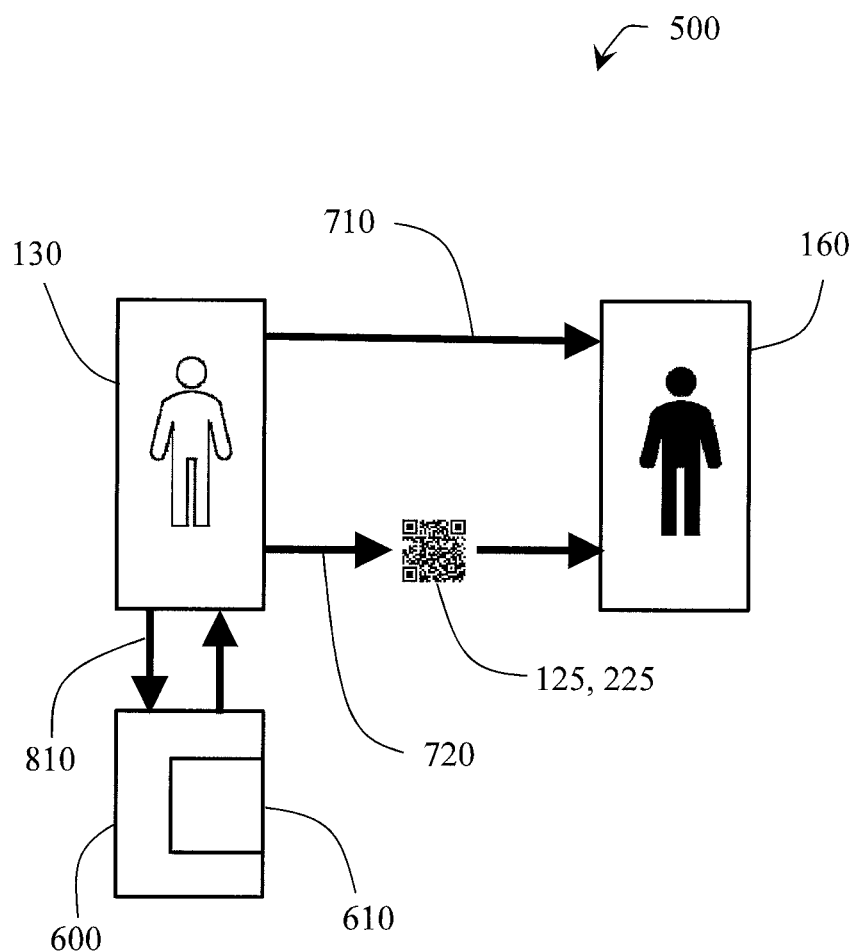
FIG. 3 depicts a further improved payment transaction method 500.

For example, FIG. 3 depicts a further improved payment transaction method 500 for commencing a payment transaction between the payment giver 160, such as a consumer, and the payment receiver 130, such as a merchant.

A push request database 600 is established, the database 600 being associated with a plurality of payment givers 160 and comprising payment giver identification data 610. This is preferably established minutes, hours or even days before the payment transaction is initiated. It may also be established immediately before the payment transaction is initiated. Additionally or alternatively, the payment transaction 500 may be paused briefly to allow the payment giver 160 to be added to the database 600.

As depicted, the payment receiver 130 may provide authorization requests 810 to the push request database 600. In practice, authorization may be requested 810 by the payment receiver 130 or a third-party, such as an arbiter, intermediary, financial institution or similar. Requests 810 may also be made by more than one party. More than one push request database 600 may also be provided. By using a third-party, peer-to-peer payment transactions may be performed.

Typically, after a payment transaction between the payment giver 160 and the payment receiver 130 is initiated, a request 810 is made for authorization of the payment giver 160 to use a push request.

If the authorization is successful, a payment push request is provided 710 to the payment giver 160 comprising an identification of the payment receiver 130. The payment transaction may then be commenced by the payment giver 160 accepting the push request.

Payment transactions may also commence without the consumer approving a particular transaction—for example, the payment giver 160 may set a parameter or option to automatically authorize or approve this type of payment transaction. However, it may be advantageous to provide some means of interaction and/or approval or authorization as an option—for example, a button 220 marked with "PAY" or "Select to Pay" on their mobile device 250, 450. Optionally, the payment receiver 130 details and/or the amount to be paid may also be displayed.

Similar to the options presented above when using a 2-dimensional coded representation 125, 225, a dedicated software application, or a similar facility in an existing payment application such as Apple Pay, Android Pay, X Pay and Samsung Pay may be used. A combination is also possible, where a plug-in module is provided for another application, such as a browser.

The push request may be provided using a non-visual interaction channel such as electrical contact, close coupling, electromagnetic radiation, NFC, RF, Bluetooth, WiFi, mobile data, LAN, USB, HTTP, HTTPS, FTP, or any combination thereof. So the further improved payment transactions 500 may be commenced however close or remote the payment receiver 130 and payment giver 160 are physically located.

If the authorization is not successful, a payment push request may not be used, and one or more of the methods described above using a 2-dimensional coded representation 125, 225 may be used 720.

Similarly, a method using a 2-d coded representation 125, 225 may be used 720 if, for example:
no push request database 600 is available
the push request database 600 is not available, not accessible or off-line
the payment giver 160 authorization is refused for any reason
the payment giver 160 authorization is no longer valid
the push authorization request 810 takes too long to generate a response
the push request database 600 receives an authorization request 810 from an unauthorized arbiter, merchant, consumer, intermediary, financial institution or similar.

Alternatively, any button presented to the payment giver 160 for use with the push request may depict a QR code or a standard QR code icon. The payment giver 160 may not see any difference between their interactions during payment using a push request 710 or payment using a 2-dimensional coded representation 720—the software and user interfaces may be configured to perform the different actions independently of the payment giver 160. In other words, the mechanism used is invisible to the user 160.

Further interactions may also be required to authenticate or verify the identity of the payment giver 160—commencement of the payment transaction may be dependent on successful authentication by the payment giver 160 using, for example, biometric data and/or a PIN code.

In some cases, a payment receiver 130 may not be aware that a payment giver 160 is authorized to use push requests, or has been informed that a previous authorization is no longer valid, or authorization has been refused. The payment giver 160 may then receive 720 a 2d coded representation 125, 225 after the further improved payment transaction method 500 has been performed.

The skilled person will realise that the further improved payment transaction method 500 may be repeated, but with the payment giver 160 requesting 810 authorization to use a push request. This may be done automatically using a suitably-programmed mobile device 250, 450, manually by an interaction of the payment giver 160 or a combination thereof. If this second attempt at authorization is successful, the payment giver 160 will receive the push request.

If the push request database 600 is established and/or administrated by a third-party, the payment giver 160 may need to establish a relationship such as making a user account and providing financial and/or payment details—they may receive a payment giver identification 610. Such an identification may be provided in the request 810 to the push request database 600 for authorization.

Additionally or alternatively, the payment receiver 130 may need to establish a relationship with the third-party, and may receive a payment receiver identification. this identification may be provided with 720 the 2d coded representation 125, 225 and/or the push request 710.

Similarly, when shopping online, the payment giver 160 may be allowed to select to receive either a push request 710 or to receive 720 a 2d coded representation 125, 225 as part of the check-out procedure. Authorisation 810 to use a push request may be requested during check-out and/or it may have been requested earlier, for example:
- when the use account for that website was made;
- during a scheduled authorization check of registered users;
- when an item was placed in the shopping cart.

The method steps and descriptions thereof herein should not be understood to prescribe a fixed order of performing the method steps described therein. Rather the method steps may be performed in any order that is practicable.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

REFERENCE NUMBERS USED IN DRAWINGS

100 Code-enabled payment transaction method
110 POI (Point of Interaction) Terminal
120 Display
125 Visually-readable 2d coded representation
130 Payment receiver
150 Code recognition device
155 Image capture device
160 Payment giver
210 POS (Point of Service) Terminal
220 Payment Confirmation Button
225 2d QR code
250 Mobile device
255 Optical camera
200 Improved code-enabled payment transaction method
310 Improved POI (Point of Interaction) Terminal
325 Non-visual interaction channel
350 Improved code recognition device
450 Improved mobile device
410 Improved POS (Point of Service) Terminal
500 Further improved payment transaction method
600 Push request database
610 Payment giver identification data
710 Push request
720 Request using 2d coded representation
810 Push authorization request

What is claimed is:

1. A computer-implemented payment transaction method comprising:
    generating, by a computing device of a merchant, a visually-readable 2-dimensional coded representation of data, the data comprising a merchant identification, and wherein the 2-dimensional coded representation includes a QR code;
    transmitting, by the computing device of the merchant, via a non-visual, radio frequency (RF) interaction channel, the 2-dimensional coded representation to a code recognition device of a consumer for identifying the merchant, such that the 2-dimensional coded representation is received, by the code recognition device, via the non-visual, RF interaction channel and not by optical recognition of the 2-dimensional coded representation;
    recognizing, by a first processor of the code recognition device, based on software of the merchant, the 2-dimensional coded representation as being associated with the merchant;
    displaying, at the code recognition device, via the software of the merchant, the 2-dimensional coded representation to the consumer;
    displaying, at the code recognition device, via the software of the merchant, a Pay-with-QR option to the consumer; and
    based on a selection of the Pay-with-QR option and recognition of the 2-dimensional coded representation as being associated with the merchant, automatically commencing, by the code recognition device, via the software of the merchant, a payment transaction from the consumer to the merchant based on the 2-dimensional coded representation.

2. The method of claim 1, wherein the computing device of the merchant includes a POI terminal comprising a second processor;
    wherein transmitting the 2-dimensional coded representation includes transmitting the 2-dimensional coded representation from the second processor of the POI terminal to the code recognition device based on the code recognition device being proximate the POI terminal; and
    wherein the non-visual, RF interaction channel includes a near-field communication (NFC) interaction channel.

3. The method of claim 1, wherein the code recognition device includes a portable electronic device, a SIM module, a mobile communications device, a mobile computer, a remote server, or any combination thereof.

4. The method of claim 1, further comprising providing the consumer with an indication that the payment transaction has been completed.

5. The method of claim 1, further comprising providing the merchant with an indication that the payment transaction has been completed.

6. The method of claim 1, wherein the code recognition device further comprises a display device; and
    wherein displaying the 2-dimensional coded representation includes displaying the 2-dimensional coded representation on the display device.

7. The method of claim 1, wherein the visually-readable 2-dimensional coded representation is one of: a unencrypted QR code, an encrypted QR code, an EMV-compliant QR code, an EMV QRCPS-compliant QR code, a Micro QR code, an IQR code, an SQRC code, a FrameQR code, and an MPQR code.

8. The method of claim 1, wherein the data further comprises a static type identification;
    wherein the first processor is further programmed to recognize the 2-dimensional coded representation as being a static type; and
    wherein the code recognition device is further configured and arranged to commence a plurality of payment transactions to the merchant based on the 2-dimensional coded representation.

* * * * *